United States Patent [19]
Staver et al.

[11] Patent Number: 5,621,831
[45] Date of Patent: Apr. 15, 1997

[54] APPARATUS AND METHOD FOR HIGH POWER LASER-TO-FIBER ALIGNMENT

[75] Inventors: Philip R. Staver, Hagaman; Sandra F. Feldman, Schenectady; Angel L. Ortiz, Jr., Saratoga Springs, all of N.Y.

[73] Assignee: General Electric Company, Schenectady, N.Y.

[21] Appl. No.: 537,600

[22] Filed: Oct. 2, 1995

[51] Int. Cl.$^6$ ........................................... G02B 6/32
[52] U.S. Cl. .................................. 385/33; 250/227.2
[58] Field of Search .......................... 385/31, 32, 33, 385/34, 147, 80, 88, 89; 250/227.23, 227.26, 227.2, 458.1; 359/40, 385, 389; 364/559, 167.01; 356/399, 400, 152, 153, 388

[56] References Cited

U.S. PATENT DOCUMENTS

| | | | |
|---|---|---|---|
| 4,564,736 | 1/1986 | Jones et al. | 219/121 L |
| 4,676,586 | 6/1987 | Jones et al. | 350/96.2 |
| 4,681,396 | 7/1987 | Jones | 350/96.18 |
| 4,739,162 | 4/1988 | Ortiz, Jr. et al. | 250/227 |
| 4,840,450 | 6/1989 | Jones et al. | 350/96.2 |
| 4,963,984 | 10/1990 | Womack | 358/225 |
| 4,984,885 | 1/1991 | Ortiz, Jr. | 356/153 |
| 5,297,061 | 3/1994 | Dementhon et al. | 364/559 |
| 5,323,009 | 6/1994 | Harris | 250/458.1 |
| 5,383,118 | 1/1995 | Nguyen | 364/167.01 |

*Primary Examiner*—Akm E. Ullah
*Attorney, Agent, or Firm*—Patrick K. Patnode; Donald S. Ingraham

[57] ABSTRACT

This invention relates to a novel apparatus and method capable of aligning an optical fiber for injection with a high power laser beam. More particularly, this apparatus and method use a camera coupled to a monitor to align the fiber tip coincident with the laser beam focus, without damaging the fiber jacket or cladding.

28 Claims, 4 Drawing Sheets

APPARATUS AND METHOD FOR HIGH POWER LASER-TO-FIBER ALIGNMENT

The following invention was made with government support under contract number MDA 972-94-30020 which was awarded by the Defense Advanced Research Projects Agency (DARPA). The government has certain rights in this invention.

Background of the Invention

The instant invention is directed in general to optical systems in which a laser beam is injected into the end of an optical fiber and, more specifically, to laser based material processing systems in which a high power laser beam is injected into the fiber input end for transmission to a remote end of the fiber where material processing is performed with the emitted beam.

Laser based material processing as known in the art and as used herein, refers to performance of processes such as cutting, welding, drilling and soldering, using a continuous wave or pulsed laser beam. The average power of such a laser beam may range from as little as approximately one watt to 1000s of watts, the specific power being selected on the basis of the particular process being performed. It is known in the art to transmit the laser beam from the laser to the vicinity of the workpiece by means of an optical fiber. Apparatus and methods for injecting a laser beam into an optical fiber for transmission there through are disclosed in commonly assigned U.S. Pat. Nos. 4,564,736; 4,676,586; and 4,681,396 respectively entitled "Industrial Hand Held Laser Tool and Laser System", "Apparatus and Method for Performing Laser Material Processing Through a Fiber Optic", and "High Power Laser Energy Delivery System", the disclosures of these patents being incorporated in their entirety herein by reference.

As disclosed in the above incorporated patents, injection of the laser beam into the fiber end is accomplished by focusing the beam, by means of one or more lenses, onto the prepared input end of the fiber. Specific requirements for the convergence of the focused beam cone, the beam spot size as focused on the fiber end, and the fiber end preparation are described in these patents. Compliance with these requirements is necessary in order to successfully inject the laser beam into the optical fiber for transmission there through. Implicit in these requirements is the need for the alignment of the focused laser beam to the optical fiber to be precise, in order to allow all or most of the laser radiation to enter the fiber core.

Perfect alignment is achieved when the plane defining the fiber tip is placed in the focus of the injected laser beam, or near the focal plane if the user determines such a position to be advantageous, and the fiber's longitudinal axis is centered on the transverse dimensions of the injected beam. Misalignment of the beam and fiber end will result in either inefficient or no beam transmission through the fiber. Where the laser beam has sufficient power, misalignment will result in damage to the fiber cladding or to the jacket surrounding the fiber cladding. Upon the occurrence of each need to replace a damaged optical fiber, the time required to effect fiber alignment with the beam injecting apparatus represents manufacturing downtime and therefore manufacturing cost and inefficiency. Furthermore, additional costs may be necessary in order to repair or replace any damaged optical fibers. Therefore, fiber injection must be completed without the high power beam damaging the fiber cladding or jacket during or after the alignment stage.

Various methods are known in the art for aligning optical components, such as the alignment of a single core optical fiber with a focused laser beam. Several methods are disclosed in commonly assigned U.S. Pat. Nos. 4,984,885; 4,840,450; and 4,739,162, respectively entitled, "Method and Apparatus for High Power Optical Fiber Injection and Alignment", "Apparatus and Method for Optical Fiber End Positioning for Laser Injection", and "Laser Beam Injecting System."

Such optical alignment methods include the use of cameras, microscopes, low power aligning lasers, infrared viewing of a high power laser operated at low, non-damaging power levels or some combination of these methods. However, most of the methods currently used to align focused beams with optical fibers only work well for low power laser beams. When these methods are used with high power beams the current methods fail to recognize that the incident beam may irradiate the fiber jacket or the cladding, which surround the fiber core, severely damaging these areas and rendering the fiber unusable.

Most current alignment methods are based on a "trial and error" approach. During a "trial and error" approach, the position of the optical fiber tip is adjusted by very small increments, often micrometers, while the laser source is incident upon the fiber. The fiber is manipulated until the beam is transmitted through the fiber core. However, during this manipulation, the incident radiation illuminates the areas surrounding the fiber core including the cladding, which is often made of silicone or doped glass, and the fiber jacket, which is often made of nylon or other organic polymers. The illumination of these unprotected and vulnerable areas often initiates catastrophic failure of the optical fiber tip.

Other methods of laser to fiber alignment utilize a variable attenuator to reduce the laser power below the damage threshold during alignment. Once alignment is accomplished, the attenuation is reduced and the full power beam is launched through the optical fiber. However, the use of a variable attenuator creates additional problems. Attenuators often fail to maintain the identical beam position over the attenuation range required, causing the transmitted beams to wander as the laser power is increased. This makes the use of attenuators in alignment methods unreliable for obtaining an accurate and reliable laser to fiber alignment.

Furthermore, a laser to fiber alignment method should be only moderately difficult to set up and maintain, such that factory personnel with little or no optical training would be fully capable of properly aligning the laser beam with the optical fiber.

Therefore, it is apparent from the above that there exists a need in the art for an apparatus and method for high power laser-to-fiber alignment, which is non-destructive to the fiber cladding and jacket. By remaining non-destructive, this apparatus and method will achieve alignment while maintaining the integrity of the cladding and the fiber jacket. Furthermore, it is apparent from the above that there also exists a need in the art for an apparatus and method for high power laser-to-fiber alignment which does not allow beams to wander during the alignment process, making it possible to obtain an accurate and reliable alignment. It is a purpose of this invention, to fulfill these and other needs in the art in a manner more apparent to the skilled artisan once given the following disclosure.

SUMMARY OF THE INVENTION

The above-mentioned needs are met by the present invention which relates to a novel apparatus and method for high power laser-to-fiber alignment. More particularly, said apparatus and method use a camera coupled to a monitor to align the fiber tip coincident with the laser beam focus.

Briefly, the instant invention is directed to an apparatus and method for positioning an optical fiber injection end for injection with a laser beam including high power laser beams, such that the fiber end is positioned at an optimal location to prevent damage to the fiber jacket or cladding.

In the preferred apparatus and method, the optimal location for the fiber end is determined using a setup which includes a high power laser source; a focusing lens; a coupon; a reflective means; a camera; and a monitor coupled to said camera. The optimal location for the injection end of the optical fiber is determined by firing a laser beam from the laser source through the focusing lens at the pre-positioned coupon to determine the injection point, often the focal point, of the emitted laser beam. The injection point is indicated by a permanent mark left on the pre-positioned coupon. Using the camera, an image of the permanent mark is focused and positioned on the monitor screen. The coupon is then removed and replaced with the optical fiber. Using the camera and the monitor, the optical fiber tip is positioned at the very same location as the permanent mark was located, indicating the injection point of the emitted laser beam. The x and y alignment of the fiber is determined by the transverse positioning of the fiber's image in the monitor while its z alignment is set by positioning the fiber's face in the same focal position as the coupon.

Therefore, the optical fiber tip is accurately positioned and ready for injection, without ever subjecting the optical fiber to the beam before the beam's injection point, often the beam's focal point, is determined. Ultimately, by using this method, the fiber jacket and cladding are protected from being damaged by the emitted laser beam during any trial and error alignment.

The preferred apparatus and method for high power laser-to-fiber alignment, offers the following advantages: good economy; ease of use; rapid set up; good control; and non-destructiveness. In fact, in many of the preferred embodiments, these factors of economy; ease of use; excellent speed; good control; and non-destructiveness, are optimized to an extent considerably higher than heretofore achieved in prior, known apparatuses and methods for high power laser-to-fiber alignment.

Other objects and advantages of the instant invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

The instant invention is directed to an apparatus and method for positioning an optical fiber injection end for injection with a laser beam including high power laser beams, such that the fiber end is maintained at an optimal location to prevent damage to the fiber jacket or cladding.

Figure 1:
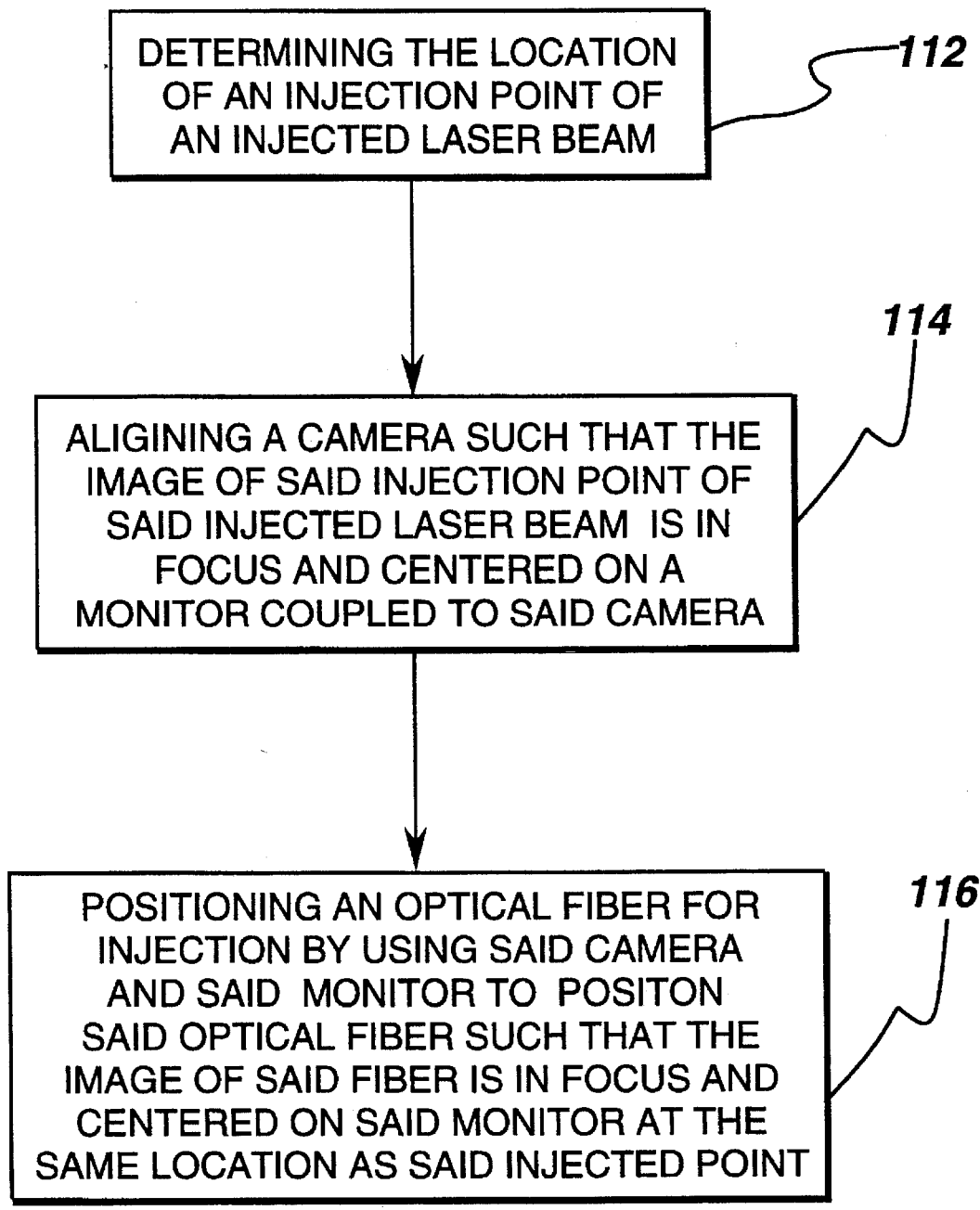
FIG. 1 is a flow chart illustrating a sequence of method steps, in accordance with the instant invention.

Referring first to FIG. 1 of the drawings, a flow chart 110 illustrates a sequence of method steps, in accordance with the instant invention.

Specifically referring to flow chart 110, the method of the instant invention requires three method steps. The first step, 112, in the instant invention is determining the location of an injection point of an injected laser beam. The second step, 114, in the instant invention is aligning a camera such that the image of the injection point of the injected laser beam is in focus and centered on a monitor coupled to said camera. The final step, 116, in the instant invention is positioning an optical fiber for injection by using the camera and monitor to position the optical fiber such that the image of the optical fiber is in focus and centered on the monitor at the same location as the image of the injection point.

Figure 2:
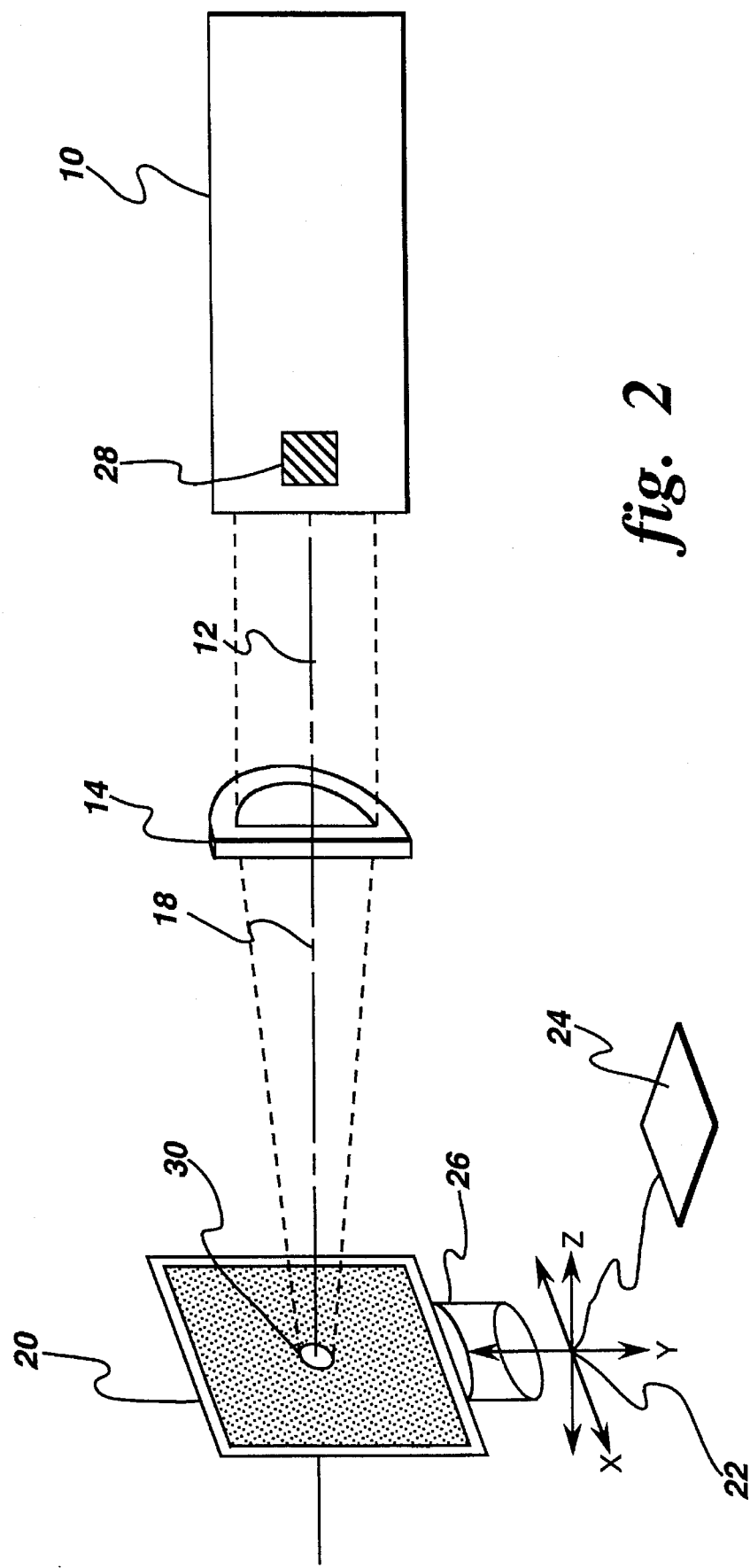
FIG. 2 is a schematic view of a high power laser apparatus for focusing the laser beam therefrom.

FIG. 2 is a schematic view of a high powered laser apparatus for performing the first step, 112, of the instant invention. The apparatus includes a laser source 10, often a high power laser source, for generating and emitting a laser beam 12. Laser source 10 may be a solid state neodymium yttrium aluminum garnet (Nd:YAG) laser source, or any laser source which operates in a pulse mode or continuous wave mode and emits a beam having a wavelength in the near infrared or visible spectrum or any other wavelength which may be transmitted through an optical fiber. Other suitable solid state laser sources include, for example: Nd:glass; Nd:GGG (Gadolinium Gallium Garnet): Nd:GSGG (Gadolinium Scandium Gallium Garnet); a ruby laser; or an alexandrite laser. The present invention is not limited to practice with any one particular laser source.

Laser beam 12 is intercepted by a focusing means 14. Focusing means 14 is represented as a single planoconvex lens for focusing a laser beam for subsequent injection into an optical fiber.

A beam 18 emitted from focusing means 14 is intercepted by a coupon 20, often a metal coupon. Coupon 20 is positioned using a first multi-axis positioner 22. Multi-axis positioner 22 may be manually controlled or controlled by a multi-axis stage controller 24. Often multi-axis positioner 22 comprises part of an optical fiber holder 26. Optical fiber holder 26, including multi-axis positioner 22 may be one such as the holder described in commonly assigned U.S. Pat. No. 4,840,450, entitled "Apparatus and Method for Optical Fiber End Positioning for Laser Injection", which is incorporated herein, in its entirety, by reference. Positioner 22 includes the three degrees of freedom shown, and may also include a tilt control to adjust fiber pitch and yaw.

To determine the injection point, often the focal point, of an injected high power laser beam, an electronic shutter 28, positioned within laser source 10, is opened for a brief period of time allowing laser source 10 to emit a beam 12. Means other than electronic shutter 28 may be used to briefly expose the coupon 20 to the emitted laser beam. Beam 12 passes through focusing means 14. Beam 18 is emitted from focusing means 14 and is intercepted by coupon 20, drilling a small hole or placing a permanent mark 30 on coupon 20. Permanent mark 30 indicates the x and y coordinates of beam 18. Often, coupon 20 will be placed in the focal plane of lens 14. If the focal plane location is not known, it may be determined by moving coupon 20 in the z direction until permanent mark 30 on coupon 20 is minimized, thereby indicating proper focus of the emitted laser beam.

Figure 3:
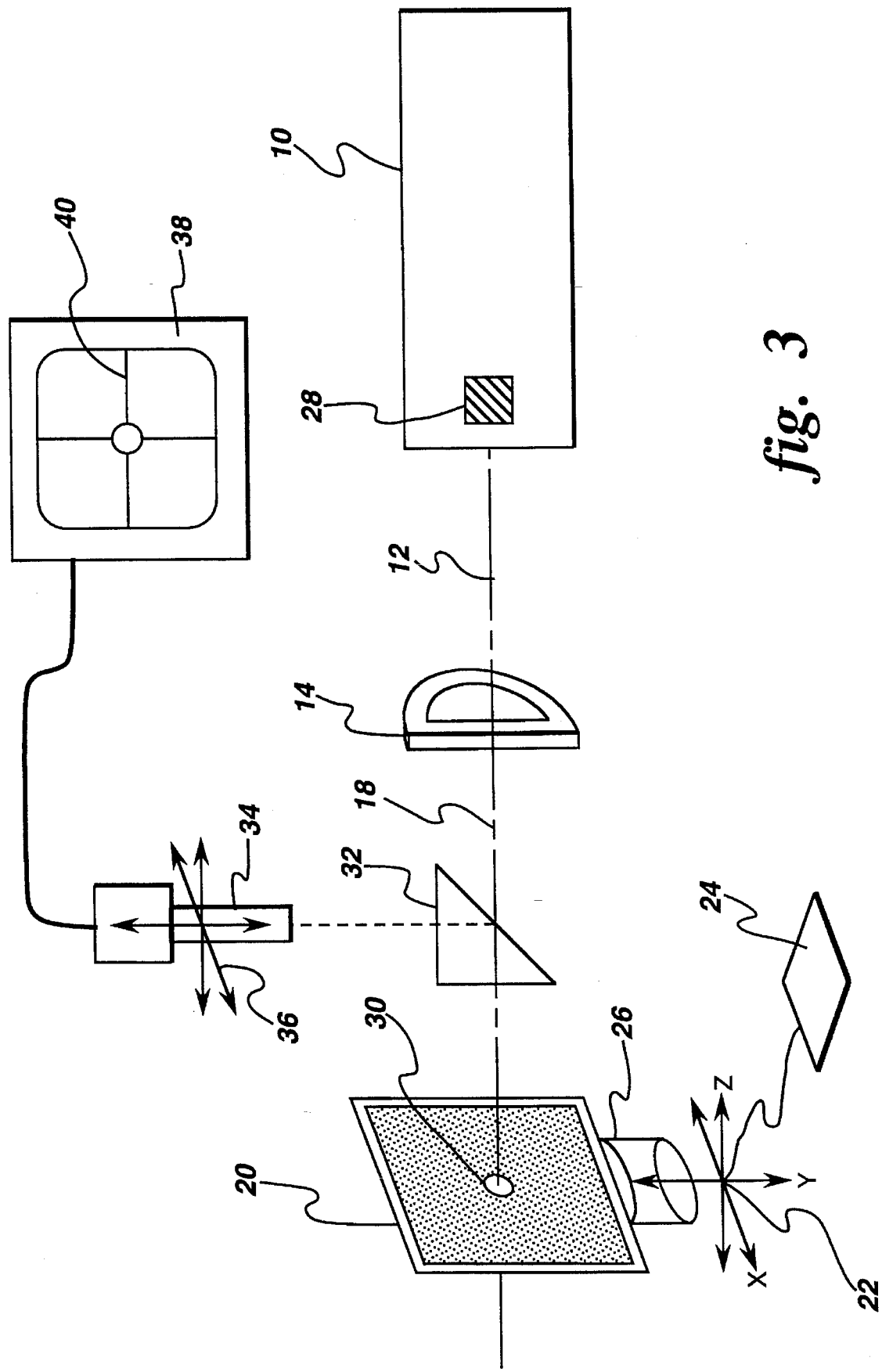
FIG. 3 is a schematic view of a high power laser apparatus for aligning a camera.

FIG. 3 is a schematic view of a high powered laser system for performing the second step of the instant invention, which includes additionally, a reflective means 32, often a prism or a mirror, translated into the path of beam 18, while beam 18 is blocked. Reflective means 32 transmits an image of the coupon 20 to a properly positioned camera 34, often fitted with a zoom lens. Camera 34 may, for example, be a charge coupled device (CCD) or charge injected device (CID). A camera such as a commercially available camera from General Electric Company, GE 2509, may also be utilized. Camera 34 may be positioned using a second multi-axis positioner 36. The image received by camera 34 may be viewed using a monitor 38, often having alignment cross-hairs 40.

To properly align camera 34, reflective means 32 is translated into the path of beam 18 while beam 18 is blocked. Permanent mark 30 on coupon 20 is imaged onto camera 34. A light may be needed to illuminate coupon 20 in order for permanent mark 30 to be visible by camera 34. Camera 34 is then adjusted until the image of permanent mark 30 on coupon 20 is in proper focus and is aligned with alignment cross-hairs 40 on monitor 38. It is important that reflective means 32 is translated into beam 18 through translation along the x axis only. If this is done, the transitional position of reflective means 32 is unimportant. Otherwise, the transitional position must carefully be reproduced whenever reflective means 32 is inserted.

Figure 4:
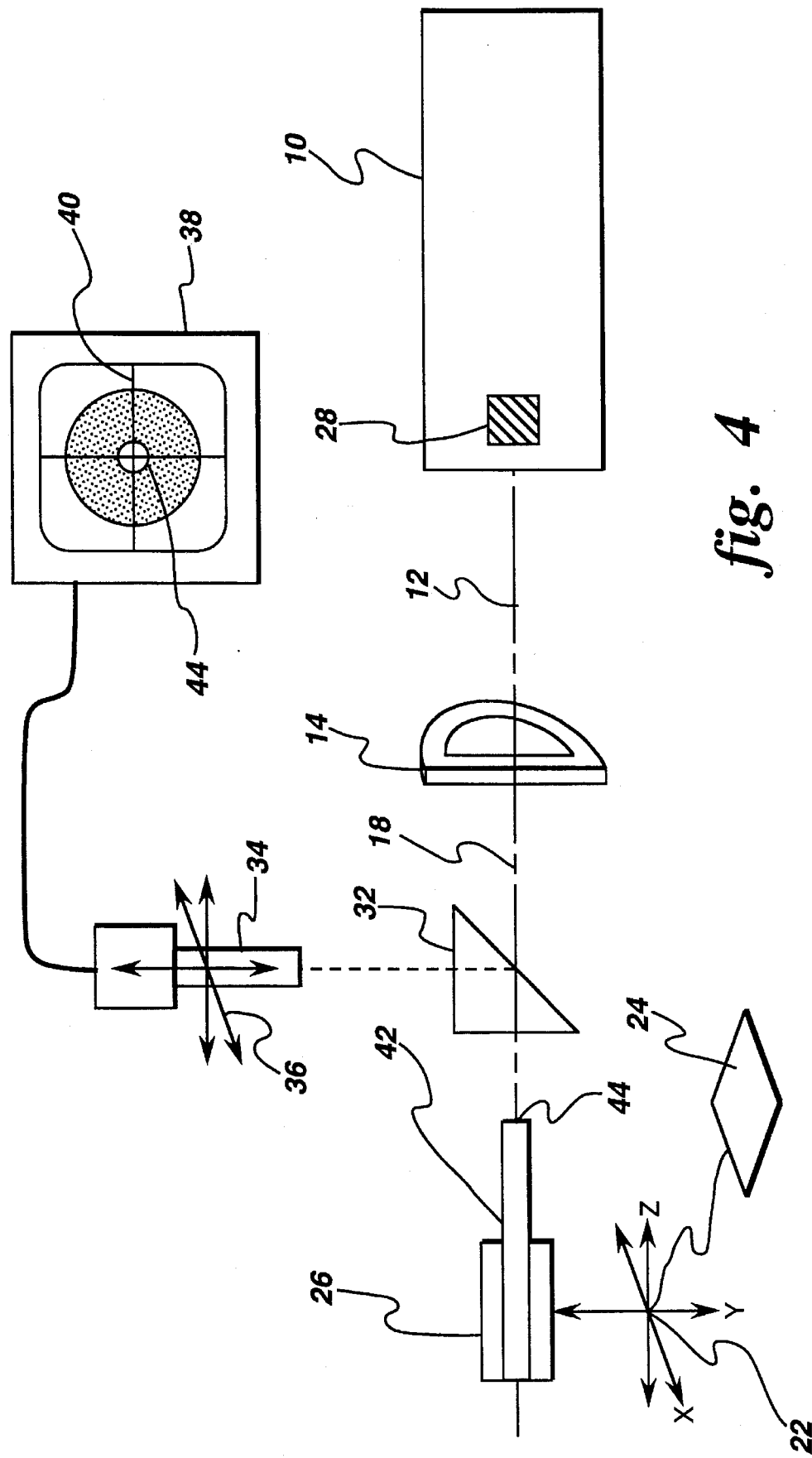
FIG. 4 is a schematic view of a high power laser apparatus for positioning an optical fiber.

FIG. 4 is a schematic view of a high power laser apparatus for positioning an optical fiber, which includes additionally, an optical fiber 42 inserted into fiber holder 26, which is coupled to multi-axis positioner 22. Coupon 20 which is shown in FIGS. 2 and 3 is removed from the apparatus. To aid in the monitor viewing of optical fiber 42, a light often illuminates the end of optical fiber 42 opposite the end being viewed. Optical fiber 42 is then viewed by camera 34 on monitor 38. Multi-axis positioner 22 moves optical fiber 42 until the image of optical fiber 42 is centered on alignment cross-hairs 40. This ensures that the tip of optical fiber 42 is positioned in the same x and y location as permanent mark 30 on coupon 20 was located, centered with the laser beam. The optimal injection z position of the emitted laser is determined by bringing the image of fiber tip 44 into focus on monitor 38. Once in focus, fiber tip 44 is positioned in the same (x,y,z) location as the injection point, often the focal spot, and yields a focus position accurate to the depth of focus of camera 34. The accuracy of this positioning method is typically an order of magnitude more accurate than that required by the depth of focus of an injected beam. Once alignment is complete, reflective means 32 is removed from the beam path and the injection process may begin.

In operation, a user of the apparatus opens electronic shutter 28, positioned within laser source 10, for a short time allowing laser source 10 to emit beam 12. Beam 12 passes through focusing means 14 and is intercepted by coupon 20, leaving a permanent mark 30 in coupon 20. Coupon 20 is moved in the z direction until the proper injection point is determined. If the focal point is the proper injection point, the size of the permanent mark 30 should be minimized, thereby indicating the focal plane location. While shutter is closed, a reflective means 32 is translated into the path of beam 18, between focusing means 14 and coupon 20. Reflective means 32 transmits an image of coupon 20 to a camera 34 positioned adjacent reflective means 32. Camera 34 is coupled to a monitor 38. Using the image of coupon 20 seen on monitor 38, the system user views the permanent mark 30 left by the emitted beam 12. Camera 34 is then adjusted until the image of permanent mark 30 is in proper focus and is aligned with alignment cross-hairs 40 on monitor 38. The user replaces coupon 30 with an optical fiber 42. Optical fiber 42 is viewed by camera 34 on monitor 38. Optical fiber 42 is moved until the image of fiber tip 44 is centered with alignment cross-hairs 40 on the monitor 38, just as the image of permanent mark 30 was previously positioned. This ensures that the (x,y) coordinates of permanent mark 30 and fiber tip 44 are the same. Fiber tip 44 is then moved in the z direction until the image of fiber tip 44 comes into proper focus on monitor 38. Once the image of fiber tip 44 is in proper focus and the transverse position is aligned simultaneously, the user has found the proper position for fiber injection. Fiber tip 44 now has the same (x,y,z) coordinates as permanent mark 30 had, thereby indicating that the injection point, often the focal point, of laser beam 18 will be located at the same position as fiber tip 44 is located. The user removes the reflective means 32 from the path of beam 18 and the injection process may begin.

In some cases it may be desirable to deliberately place the optical fiber tip 44 a short distance away from the focal plane. In particular this may be done to increase the size of the laser spot on the optical fiber tip 44. In other circumstances, the laser beam 18 may be deliberately focused either inside or outside the optical fiber core. In either situation, coupon 20 should be positioned in the plane where the user desires to place the injection face of optical fiber 42.

The foregoing has described several embodiments of an apparatus and method for alignment of high power laser fiber injection. While specific embodiments of the present invention have been described, it will be apparent to those skilled in the art that various modifications thereto can be made without departing from the spirit and scope of the invention as defined in the appended claims.

What is claimed is:

1. An apparatus for aligning an optical fiber for injection with a laser beam, comprising:

a laser source for emitting a laser beam;

a focusing means aligned with laser beam's path;

a coupon aligned with laser beam's path and with said focusing means for marking the injection point of an emitted laser beam when said beam passes through said focusing means and is projected upon said coupon; and a camera coupled to a monitor positioned adjacent said coupon for viewing an image of said marked injection point on said coupon and for accurately positioning an optical fiber tip at said injection point.

2. An apparatus for aligning an optical fiber for injection with a laser beam, according to claim 1, wherein said injection point is the laser beam's focal point.

3. An apparatus for aligning an optical fiber for injection with a laser beam, in accordance with claim 1, wherein said laser source is a high power laser source emitting a high power laser beam.

4. An apparatus for aligning an optical fiber for injection with a laser beam, in accordance with claim 1, wherein said apparatus further comprises an electronic shutter positioned within said laser source, which when opened, allows said laser source to emit a laser beam.

5. An apparatus for aligning an optical fiber for injection with a laser beam, in accordance with claim 1, wherein said laser source is a solid state neodymium yttrium aluminum garnet laser source.

6. An apparatus for aligning an optical fiber for injection with a laser beam, in accordance with claim 1, wherein said focusing means is a planoconvex lens.

7. An apparatus for aligning an optical fiber for injection with a laser beam, in accordance with claim 1, wherein said coupon is a metal coupon.

8. An apparatus for aligning an optical fiber for injection with a laser beam, in accordance with claim 1, wherein said coupon is positioned using a multi-axis positioner.

9. An apparatus for aligning an optical fiber for injection with a laser beam, in accordance with claim 8, wherein said multi-axis positioner comprises part of an optical fiber holder.

10. An apparatus for aligning an optical fiber for injection with a laser beam, in accordance with claim 8, wherein said multi-axis positioner is coupled to and controlled by a multi-axis stage controller.

11. An apparatus for aligning an optical fiber for injection with a laser beam, in accordance with claim 1, wherein said camera is a CCD camera.

12. An apparatus for aligning an optical fiber for injection with a laser beam, in accordance with claim 1, wherein said camera is a CID camera.

13. An apparatus for aligning an optical fiber for injection with a laser beam, in accordance with claim 1, wherein said camera further includes a zoom lens.

14. An apparatus for aligning an optical fiber for injection with a laser beam, in accordance with claim 1, wherein said camera is positioned using a multi-axis positioner.

15. An apparatus for aligning an optical fiber for injection with a laser beam, in accordance with claim 1, further comprising a reflective means temporarily positioned between said focusing means and said coupon for projecting an image of said coupon to said camera.

16. An apparatus for aligning an optical fiber for injection with a laser beam, in accordance with claim 15, wherein said reflective means is a prism.

17. An apparatus for aligning an optical fiber for injection with a laser beam, in accordance with claim 15, wherein said reflective means is a mirror.

18. An apparatus for aligning an optical fiber for injection with a laser beam, in accordance with claim 1, wherein said monitor further includes alignment cross-hairs.

19. An apparatus for aligning an optical fiber for injection with a laser beam, in accordance with claim 1, further comprising a light positioned adjacent said coupon to make said coupon's image on said monitor more visible.

20. A method of aligning an optical fiber for injection with a laser beam, comprising the following steps:

determining the location of an injection point of an injected laser beam;

aligning a camera such that an image of said injection point of said injected laser beam is in focus and centered on a viewing monitor coupled to said camera; and positioning an optical fiber for injection by using said camera and said monitor to position said optical fiber such that an image of said fiber is in focus and centered on said viewing monitor at the same location as the image of said injection point of said injected laser beam.

21. A method of aligning an optical fiber for injection with a laser beam, using an apparatus comprising a laser source, a focusing means, a coupon, a reflective means, an optical fiber, and a camera coupled to a monitor, comprising the following steps:

firing a beam from said laser source for a short period of time;

positioning said focusing means and said coupon such that said beam passes through said focusing means and is intercepted by said coupon leaving a permanent mark upon said coupon;

translating a reflective means into said laser beam path such that said reflective means transmits an image of said coupon to said camera positioned adjacent to said reflective means;

viewing said image of said coupon on said monitor coupled to said camera;

adjusting said camera until an image of said permanent mark is properly aligned and focused on said monitor;

replacing said coupon with said optical fiber;

viewing said optical fiber with said camera on said monitor; and moving said optical fiber until an image of said optical fiber's tip is properly aligned and focused on said monitor.

22. A method of aligning an optical fiber for injection with a laser beam, in accordance with claim 21, wherein said laser source is a high power laser source.

23. A method of aligning an optical fiber for injection with a laser beam, in accordance with claim 21, wherein said focusing means is a planoconvex lens.

24. A method of aligning an optical fiber for injection with a laser beam, in accordance with claim 21, wherein said apparatus further includes a multi-axis positioner for positioning said coupon coupled and controlled by a multi-axis stage controller.

25. A method of aligning an optical fiber for injection with a laser beam, in accordance with claim 21 wherein said camera is a CCD camera.

26. A method of aligning an optical fiber for injection with a laser beam, in accordance with claim 21, wherein said reflective means is a prism.

27. A method of aligning an optical fiber for injection with a laser beam, in accordance with claim 21, wherein said method step of firing a beam from said laser source for a short period of time is completed using an electronic shutter positioned within said laser source.

28. An apparatus for aligning an optical fiber for injection with a laser beam, comprising:

a high power laser source for emitting a laser beam;

a focusing lens aligned with said high power laser beam's path;

a metal coupon aligned with said high power laser beam's path and with said focusing lens for marking the injection point of an emitted high power laser beam when said high power beam passes through said focusing lens and is projected upon said metal coupon;

a CCD camera coupled to a monitor positioned adjacent said metal coupon for viewing an image of said marked injection point on said metal coupon and for accurately positioning an optical fiber tip at said injection point.

* * * * *